1,550,786

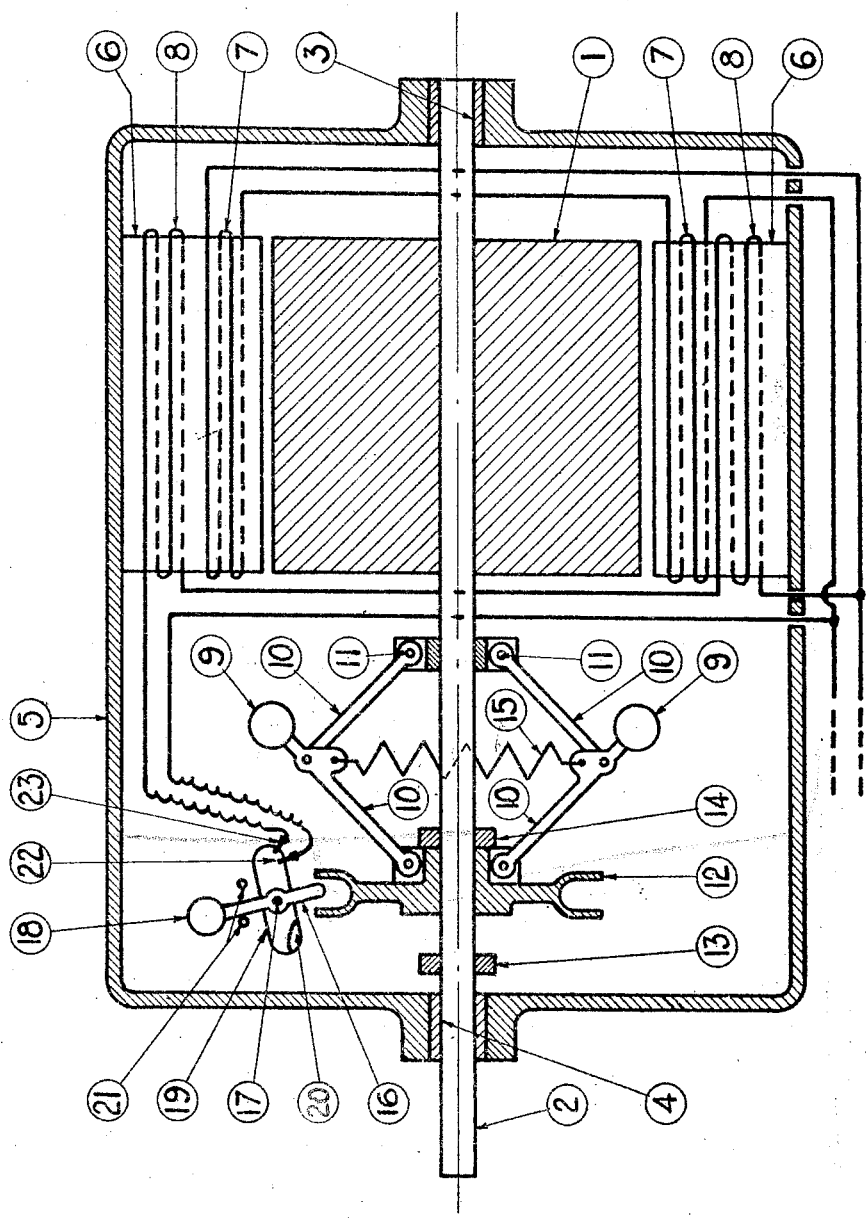
Aug. 25, 1925.
R. W. DAVENPORT
ELECTRIC MOTOR
Filed April 4, 1924
1,550,786
Ransom W. Davenport
INVENTOR Patented Aug. 25, 1925.

UNITED STATES PATENT OFFICE.

RANSOM W. DAVENPORT, OF DETROIT, MICHIGAN.

ELECTRIC MOTOR.

Application filed April 4, 1924. Serial No. 704,107.

*To all whom it may concern:*

Be it known that I, RANSOM W. DAVENPORT, a citizen of the United States, residing at Detroit, in the county of Wayne and State of Michigan, have invented a new and useful Electric Motor, of which the following is a specification.

This invention is an improvement in electric motors of the class known as induction motors, and among its objects is the provision of improved means for operating such motors on single-phase alternating currents.

Single-phase motors of the squirrel-cage type are usually started by means of an auxiliary phase-splitting winding on the stator, which winding is connected to the mains through some form of switch which is generally operated to disconnect the winding at a certain pre-determined speed, by some form of centrifugal device. Other than this switch, there need be no movable contacts in such motors. Were it not for the unavoidable sparking attending the operation of this switch, single-phase motors could be operated under conditions where sparking is not permissible (as, for example, in inflammable vapors) with no danger whatever.

It is the particular object of the present invention to provide a motor of the class described whose operation may be effected without exposing the atmosphere within and surrounding it to any sparking whatever, thereby providing single-phase motors for new purposes and applications hitherto impossible.

The accompanying drawing is a view partly in section, showing the operating relationship of the elements which may be used to embody this invention.

Referring to the drawing, 1 is a squirrel-cage rotor mounted on shaft 2 in bearings 3 and 4, and enclosed within the frame 5 enclosing the stator 6. On the stator are disposed the running windings 7—7 and the starting windings 8—8. Mounted on the shaft 2 is a centrifugal mechanism comprising the weights 9—9 mounted on arms 10—10—10—10, pivoted at one end 11, and at the other, pivoted in grooved collar 12 which is movable on shaft 2 between stop-collars 13 and 14, and held toward stop 13 by spring 15. The collar 12 has a deep groove, adapted to engage the short arm of lever 16, pivoted at 17 and weighted by 18 above the center 17. Also mounted on pivot 17 and movable with and by lever 16 is a sealed tube 19, containing a globule of mercury 20 and an inert substance such as nitrogen, and having contacts 22 and 23 sealed in one end and adapted to be connected by the mercury when the lever and tube are in one position, but which are separated by a gap when the mercury is shifted by moving the lever and tilting the tube. The contacts 22 and 23 are connected in series with the winding 8—8 to the mains.

The operation of my invention is as follows: when the current is applied to the motor terminals, it flows through both windings 7—7 and 8—8 producing a quasi-rotating field in the usual manner, and causing rotation of the rotor 1. As the speed of 1 increases, the weights 9—9 are thrown outward by centrifugal force, causing collar 12 to leave stop 13 and move against spring 15 toward stop 14. The movement of the grooved collar 12 moves lever 16 which is engaged by the groove, thus tilting the tube 19. When the speed of the rotor is sufficiently high, the collar 12 will have moved enough to displace the weight 18 past center 17, and the tube 19 will tilt the rest of the way against stop 21, thus rolling the mercury 20 away from the contacts 22—23 and interrupting the current through starting winding 8—8, while the fork moves free of the lever 16. The motor now operates as a simple induction motor with perfectly free rotor. Upon interrupting the supply current to the winding 7—7, the above cycle of operations is reversed, leaving all in position for the next start.

It is plain that by the means I provide, no danger can arise through the igniting of inflammable vapors or other effect of sparking on the atmosphere permeating the motor, since the operation of the motor is accomplished wholly without sparking in the said atmosphere.

While I have shown and described in detail a centrifugal device for operating the switch, I do not claim any particular form of centrifugal device, since its form may be varied without departing from the spirit of my invention. Neither do I claim any particular form of contact device, since any form of hermetically sealed switch may be adapted to the purposes set forth.

I claim—

1. In a split-phase electric motor having a starting winding on the stator, a movable enclosure hermetically sealed, an electric switch within the enclosure adapted to be operated by the movements of said enclosure, conductors sealed through the wall of said enclosure adapted to connect said switch in series with said starting winding, a chemically inert substance surrounding said switch, and means for automatically moving the enclosure to operate the switch when the motor has reached pre-determined speeds.

2. In an induction motor, the combination with a squirrel-cage rotor and a starting winding on the stator, of a hermetically sealed, tiltably mounted enclosure; a conducting fluid within said tiltable enclosure, conductors sealed through the wall of said enclosure, connectors disposed to connect said conductors in series with aforesaid starting winding, and means operated by the aforesaid squirrel-cage rotor acting to tilt said enclosure and cause said conducting fluid to make and break contact between said conductors when the speed of the said rotor is respectively below and above a predetermined range.

3. In an induction motor the combination with a squirrel-cage rotor and a starting winding on the stator, of a hermetically sealed, tiltably mounted, mercury switch, conductors arranged to connect said mercury switch in series with said starting winding, and a centrifugal device adapted to be operated by the rotation of aforesaid rotor acting to tilt said mercury switch when the speed of said rotor traverses a predetermined range.

RANSOM W. DAVENPORT.